United States Patent
Moreau et al.

(10) Patent No.: US 10,616,320 B2
(45) Date of Patent: Apr. 7, 2020

(54) SYSTEM AND METHOD FOR RESTFUL MANAGEMENT DISTRIBUTED COLLECTION IN AN APPLICATION SERVER ENVIRONMENT

(71) Applicant: ORACLE INTERNATIONAL CORPORATION, Redwood Shores, CA (US)

(72) Inventors: Thomas O. Moreau, Nashua, NH (US); Loren Konkus, Novi, MI (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 152 days.

(21) Appl. No.: 15/706,249

(22) Filed: Sep. 15, 2017

(65) Prior Publication Data
US 2018/0084040 A1     Mar. 22, 2018

Related U.S. Application Data

(60) Provisional application No. 62/395,962, filed on Sep. 16, 2016, provisional application No. 62/395,964, filed on Sep. 16, 2016.

(51) Int. Cl.
| | |
|---|---|
| *H04L 29/08* | (2006.01) |
| *H04W 80/12* | (2009.01) |
| *H04L 12/26* | (2006.01) |
| *H04L 12/24* | (2006.01) |

(52) U.S. Cl.
CPC ......... *H04L 67/1025* (2013.01); *H04L 67/02* (2013.01); *H04L 67/025* (2013.01); *H04L 67/1029* (2013.01); *H04L 67/1095* (2013.01); *H04W 80/12* (2013.01); *H04L 41/12* (2013.01); *H04L 43/028* (2013.01)

(58) Field of Classification Search
CPC . H04L 43/0817; H04L 41/22; H04L 67/2847; H04L 67/1025; H04L 67/1095; H04L 67/1029; H04L 67/02; H04L 67/025; H04L 43/028; H04L 41/12; G06F 9/45512; G06F 11/3616; H04W 80/12
See application file for complete search history.

(56) References Cited

U.S. PATENT DOCUMENTS

| | | | |
|---|---|---|---|
| 8,117,306 B1 * | 2/2012 | Baumback | .......... H04L 43/0817 709/224 |
| 2002/0184312 A1 | 12/2002 | Chen et al. | |
| 2004/0215725 A1 | 10/2004 | Love et al. | |

(Continued)

OTHER PUBLICATIONS

Pei, Yuanteng (Jeff), "REST Commander: Scalable Web Server Management and Monitoring", Mar. 11, 2014, 3 pages. Retrieved on Sep. 12, 2017 from http://ebaytechblog.com/2014/03/11/rest-commander-scalable-web-server-management-and-monitoring/.

(Continued)

*Primary Examiner* — Jungwon Chang
(74) *Attorney, Agent, or Firm* — Tucker Ellis LLP

(57) ABSTRACT

In accordance with an embodiment, described herein is a system and method for RESTful management distributed collection in an application server environment. Distributed collection can be used to improve the performance of REST searches that fan-out across servers, by having the managed servers assist in the fan-out, instead of having the admin server fan-out to each managed server directly.

19 Claims, 7 Drawing Sheets

(56) References Cited

U.S. PATENT DOCUMENTS

| | | |
|---|---|---|
| 2005/0216585 A1* | 9/2005 | Todorova ................ H04L 41/22 |
| | | 709/224 |
| 2007/0044144 A1 | 2/2007 | Knouse et al. |
| 2013/0081128 A1* | 3/2013 | Gupta ................ G06F 9/45512 |
| | | 726/9 |
| 2014/0006626 A1 | 1/2014 | Breiter et al. |
| 2014/0189681 A1 | 7/2014 | Bryan et al. |
| 2014/0201242 A1 | 7/2014 | Bakthavachalam et al. |
| 2015/0373097 A1* | 12/2015 | Konkus ............... H04L 67/1025 |
| | | 709/203 |
| 2016/0094647 A1* | 3/2016 | Mordani ............... G06F 16/213 |
| | | 709/226 |
| 2016/0098254 A1* | 4/2016 | Paternostro ............... G06F 8/35 |
| | | 717/105 |
| 2017/0048319 A1* | 2/2017 | Straub ................ H04L 67/2847 |
| 2017/0060730 A1* | 3/2017 | Li ....................... G06F 11/3616 |

OTHER PUBLICATIONS

McCool, Michael, "Parallel Pattern 7: Reduce", Dec. 4, 2009, 3 pages. Retrieved on Sep. 12, 2017 from http://www.drdobbs.com/architecture-and-design/parallel-pattern-7-reduce/222000718.

Cozzi, Patrick, "Parallel Algorithms", University of Pennsylvania, Spring 2012, 21 pages. Retrieved on Sep. 12, 2017 from http://cis565-spring-2012.github.io/lectures/02-01-Parallel-Algorithms.pdf.

United States Patent and Trademark Office, Notice of Allowance dated May 11, 2018 for U.S. Appl. No. 14/748,011, 6 Pages.

United States Patent and Trademark Office, Office Action dated Dec. 28, 2017 for U.S. Appl. No. 14/748,011, 31 Pages.

* cited by examiner

Servlets

Showing 1 to 3 of 3 Previous | Next

| Servlet Name | Context Root | Application | Reload Total Count | Invocation Total Count | Pool Max Capacity | Execution Time Average | Servlet Path |
|---|---|---|---|---|---|---|---|
| /index.jsp | /alfred | alfred (v1) | 1 | 15 | 0 | 0 | /index.jsp |
| FileServlet | /alfred | alfred (v1) | 0 | 0 | 0 | 0 | |
| JspServlet | /alfred | alfred (v1) | 1 | 1 | 0 | 7172 | *.jspx |

Showing 1 to 3 of 3 Previous | Next

*FIGURE 7*

SYSTEM AND METHOD FOR RESTFUL MANAGEMENT DISTRIBUTED COLLECTION IN AN APPLICATION SERVER ENVIRONMENT

CLAIM OF PRIORITY

This application claims the benefit of priority to U.S. Provisional Patent Application titled "SYSTEM AND METHOD FOR RESTFUL MANAGEMENT DISTRIBUTED COLLECTION IN AN APPLICATION SERVER ENVIRONMENT", Application No. 62/395,962, filed Sep. 16, 2016; and U.S. Provisional Patent Application titled "SYSTEM AND METHOD FOR RESTFUL MANAGEMENT SEARCH RESULTS CONSOLIDATION IN AN APPLICATION SERVER ENVIRONMENT", Application No. 62/395,964, filed Sep. 16, 2016; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application server, cloud, or other computing environments, and are particularly related to a system and method for RESTful management distributed collection in an application server environment.

CROSS-REFERENCE TO RELATED APPLICATIONS

This application is related to U.S. Patent Application titled "SYSTEM AND METHOD FOR SUPPORTING RESTFUL MANAGEMENT IN A MULTITENANT APPLICATION SERVER ENVIRONMENT", application Ser. No. 14/748,011, filed Jun. 23, 2015; which above application is herein incorporated by reference.

BACKGROUND

In an application server environment, the application server domains need to be monitored and managed on a continual basis. Typical consoles have pages that summarize/display data for applications and resources deployed within a domain, and that means runtime MBean data must be collected from a large number of MBeans on each running server. As the number of servers in a domain grows, so also does the amount of information collected and the time it takes to gather that information.

SUMMARY

In accordance with an embodiment, described herein is a system and method for RESTful management distributed collection in an application server environment. Distributed collection can be used to improve the performance of REST searches that fan-out across servers, by having the managed servers assist in the fan-out, instead of having the admin server fan-out to each managed server directly.

BRIEF DESCRIPTION OF THE FIGURES

FIG. 7 illustrates an example of an admin console page displaying summarized metrics for each servlet in a domain.

DETAILED DESCRIPTION

In accordance with an embodiment, described herein is a system and method for RESTful management distributed collection in an application server environment. Distributed collection can be used to improve the performance of REST searches that fan-out across servers, by having the managed servers assist in the fan-out, instead of having the admin server fan-out to each managed server directly.

Application Server Environment

Figure 1:
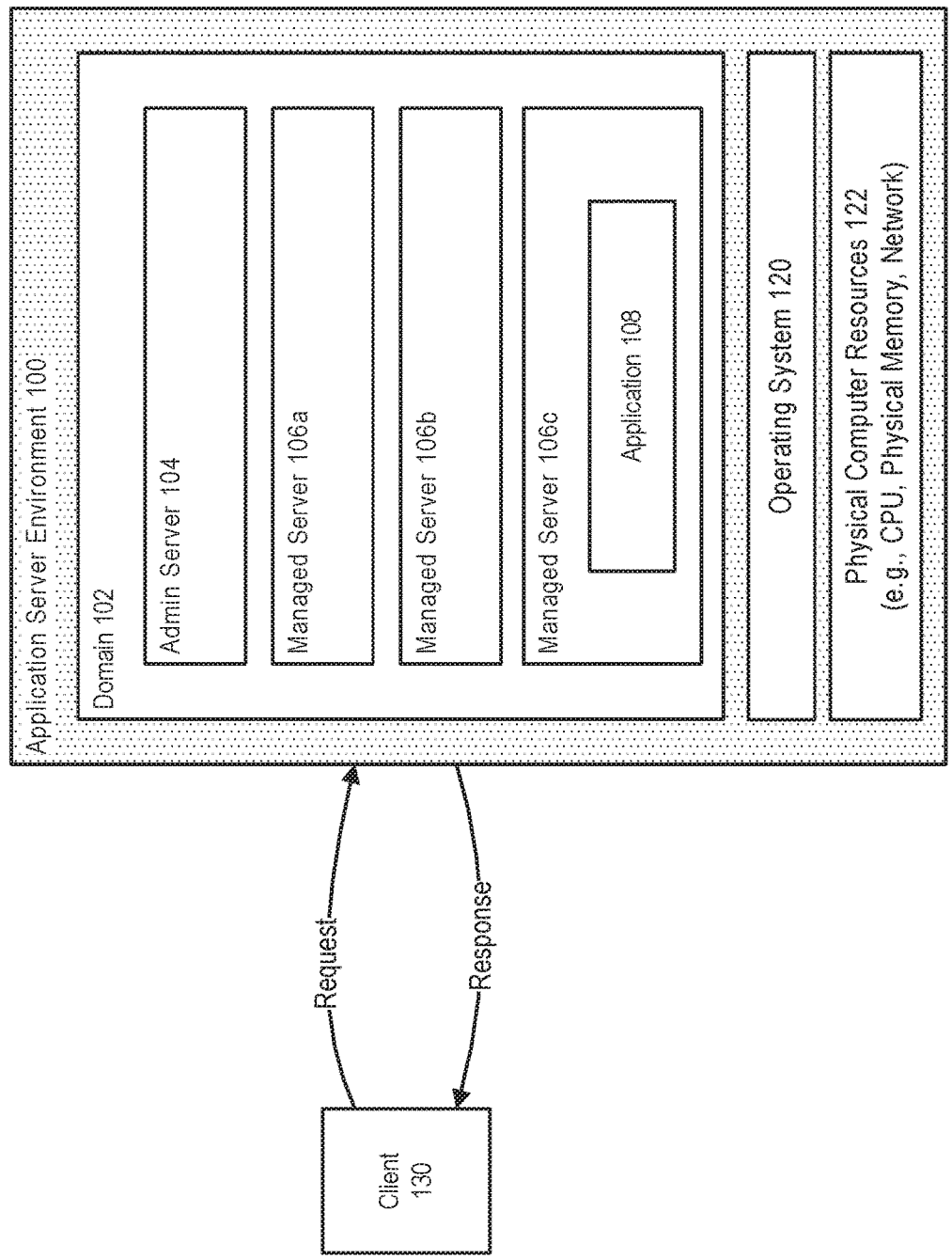
FIG. 1 illustrates a system that includes an application server, cloud, or other environment, in accordance with an embodiment.

FIG. 1 illustrates a system that includes an exemplary application server, cloud or other environment 100, in accordance with an embodiment.

As illustrated in FIG. 1, in accordance with an embodiment, an application server (e.g., WebLogic Server (WLS)) environment 100, or other computing environment which enables the deployment and execution of software applications, can be configured to include and operate according to a domain configuration that is used at runtime to define a domain 102 comprising a logically related group of resources.

In accordance with an embodiment, a domain can include a special server instance called an administration (admin) server 104, which acts as the central point from which resources are configured and managed in the domain. Typically, a domain is configured to include additional server instances called managed servers 106a-106c. Applications, Enterprise Java Beans (EJBs), and other resources can be deployed onto the managed servers and use the admin server for configuration and management purposes.

In accordance with an embodiment, each of the servers can include one or more physical devices or computer hardware resources 122, such as one or more processors (CPU), physical memory, network components, or other types of hardware resources, and can include an operating system 120 or other processing environment which supports execution of applications and EJBs.

In accordance with another embodiment, a managed server can be assigned to act as the central point from which resources are configured and managed in the domain so that a separate admin server need not necessarily be included in the application, cloud or other environment.

In accordance with an embodiment, server administration tasks can be accomplished by an administrator or other user by accessing MBeans, either directly using Java Management Extensions (JMX), or through a JMX client like the WebLogic Administration Console or WebLogic Scripting Tool (WLST), or alternatively through RESTful management tools.

In accordance with an embodiment, one or more applications 108 can be deployed to the one or more managed servers. A client 130 can send and receive requests to the one or more managed servers to interact with the managed servers and the one or more applications deployed thereon.

Management of an Application Server Environment Based on MBean Data Collection

Application server domains are monitored and managed on a continual basis. Whether customers use the WebLogic Server (WLS) console, Fusion Middleware (FMVV) Control, or their own dashboard applications, these consoles have pages that summarize and/or display data for applications and resources deployed within a domain. The data is collected from the runtime MBeans on each running server. As the number of servers in a domain grows, so does the amount of information collected and the time it takes to gather that information.

Figure 2:
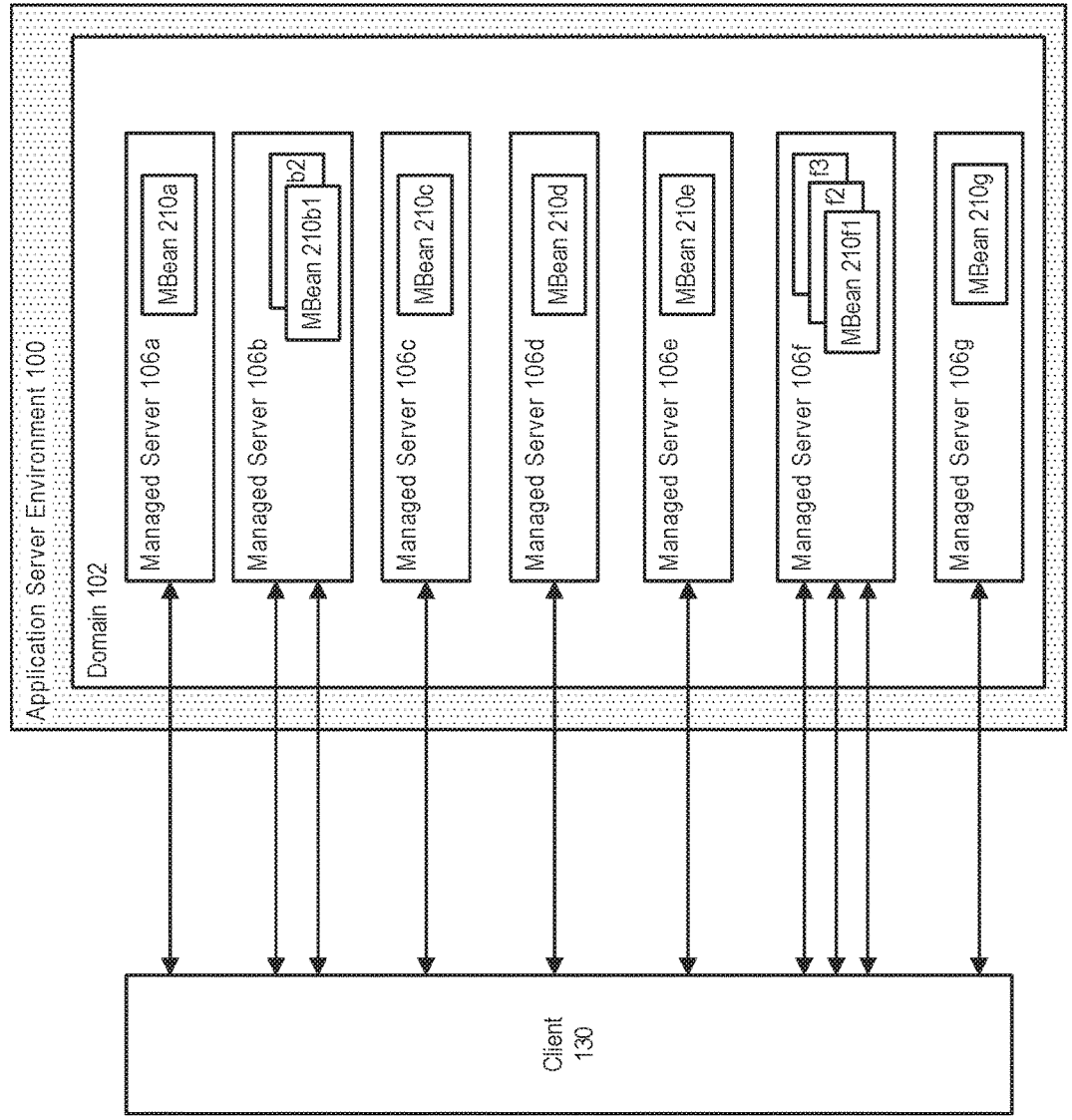
FIG. 2 illustrates a client requesting metrics from servers in an application server environment, in accordance with the prior art.

Referring to FIG. 2, currently, the time required to gather this information is proportional to the number of servers used in a deployment. Consoles requesting and displaying data use JMX to contact the per-server runtime MBeans. A client 130 may make a remote procedure call (RPC) directly to each runtime MBean 210a-210g of each managed server 106a-106g in an application server environment.

Consoles requesting data for display can respond extremely slowly where there are many running servers, because JMX requires a separate RPC for each runtime MBean on each server. The slow response limits how many servers can be configured in a WLS if the WLS domain is to be effectively monitored and managed by an administrator.

In this scenario, the client has the ability to communicate with each server directly and must makes calls for each MBean either sequentially or in parallel to gather information, including performance metrics, and consolidate the information for presentation to a user and/or make decisions based on the information. This approach moves all responsibility for scaling to the client. The client must have very robust, complicated logic to request, gather, and consolidate all of this information effectively. The client must create multiple threads of execution, wait for all of the requests to be completed, manage those servers that might not be responsive, etc. This is burdensome for the client.

Figure 3:
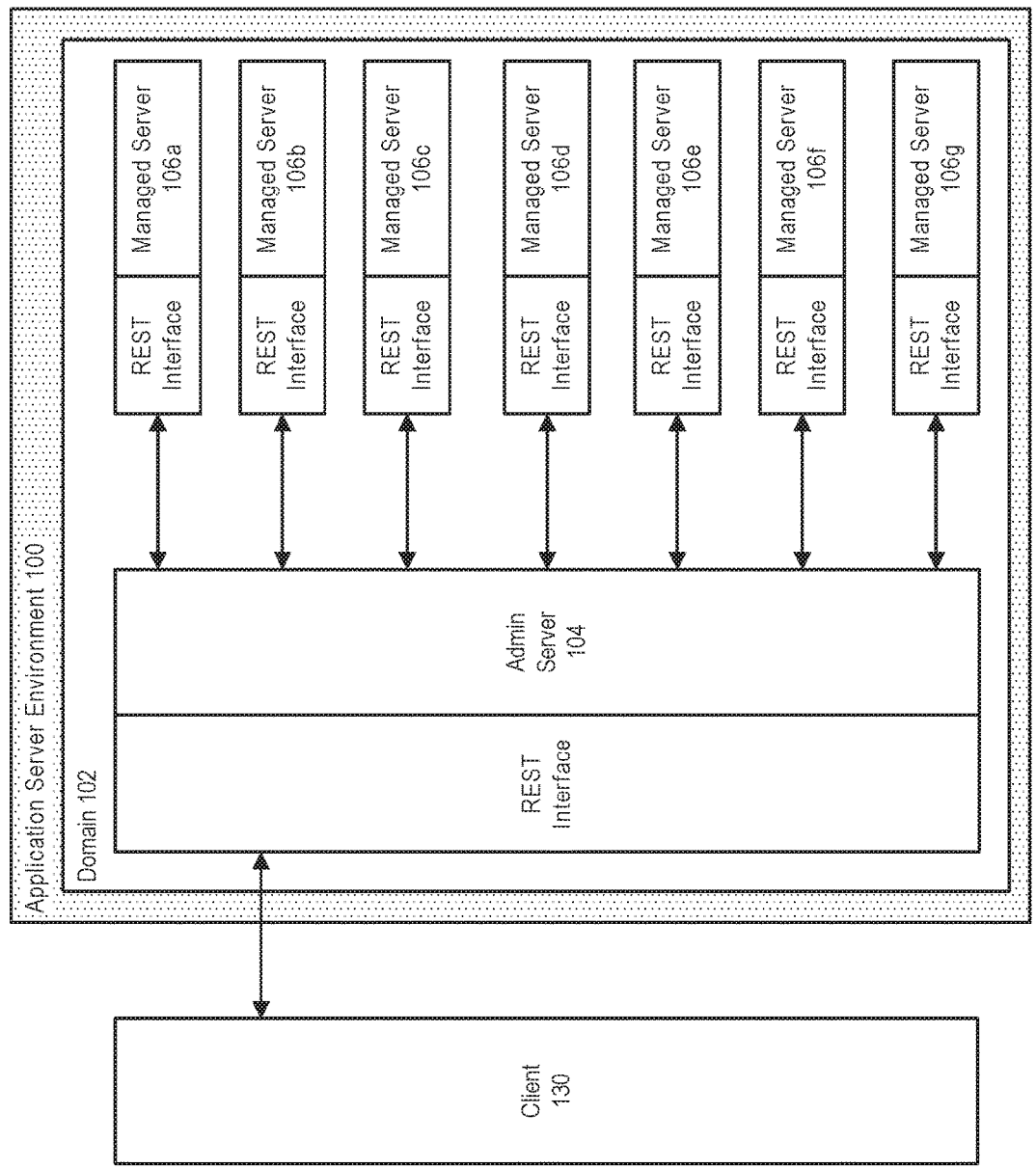
FIG. 3 further illustrates a client requesting metrics from servers in an application server environment, in accordance with the prior art.

Referring to FIG. 3, RESTful management resources in an application server environment support single requests that search across a domain. A client can make one REST request to an admin server to get information about all application servlets on all the running servers. The admin server, in turn, makes one REST search request to each managed server, instructing the managed server to do its part of the search. Unlike JMX, this effectively uses one RPC per server, rather than requiring one RPC per MBean.

Results returned to the admin server from the individual managed servers can be consolidated and returned to the client, so that the burden of executing the search on the domain request, including have to deal with all concurrent and scalability issues, falls on the admin server rather than the client, which need only make a single call to REST on the admin server.

REST resources can outperform JMX interactions when gathering domain-wide metrics and status, and performance critical pages for consoles can be refactored to use REST resources. However, use of REST resources alone may not improve request and response speeds enough for domains with a very large number of managed servers. A REST webapp on an admin server uses a work manager to send REST search requests to each managed server. The work manager has a limited number of available threads and runs on a processor with a limited number of cores. If the number of managed servers is larger than the number of available threads, then the work is effectively serialized into batches based on the number of threads.

As an example, for a domain with 10,000 managed servers, an admin server with 20 available threads, and a response time for searching a managed server of 50 milliseconds, information can be requested and received in 500 sequential batches of 20 servers with an unacceptably slow overall response time of about 25 seconds. The response time worsens as the number of servers increases. To achieve an acceptably low page response time, information must be collected more efficiently.

RESTful Management Distributed Collection

In accordance with an embodiment, a system is configured to use RESTful management distributed collection in an application server environment to improve the performance of REST searches that fan-out across servers, by having the managed servers assist in the fan-out, instead of relying on the admin server to send REST searches to each of the managed servers directly.

In accordance with an embodiment, using REST searches with fan-out assigned to multiple managed servers to gather metrics and status to monitor a domain can significantly improve the scalability of WLS, and provide an opportunity to further improve performance in very large domains. As a result, the amount of time required to gather metrics and status across a large number of servers is less of a limiting factor in how many servers a WLS domain can practically support.

Figure 4:
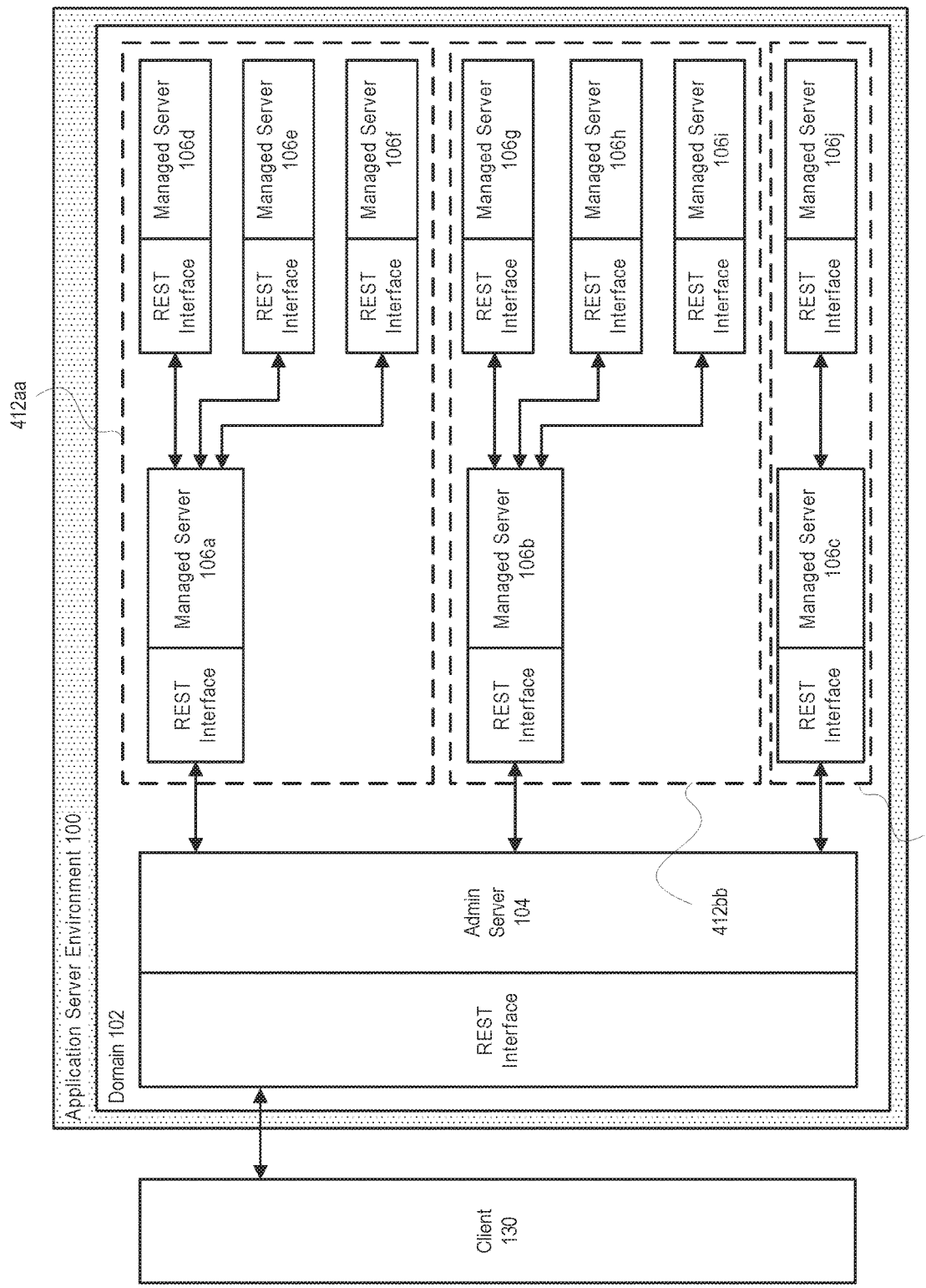
FIG. 4 illustrates a client requesting metrics from servers in an application server environment, in accordance with an embodiment.

Referring to FIG. 4, in accordance with an embodiment, an admin server can groups servers in an application server environment into nested batches 412aa-412cc for purposes of sending REST requests that are fanned out between servers. The admin server can define the groupings such that the overall search performance is optimized to meet requirements. For example, the admin server can group the servers in nested batches that are smaller than the number of available threads so that fan-outs are performed in parallel. The admin server can also group servers that run on the same hardware together, as RPCs between co-located servers are typically faster. The admin server can also minimize the depth of the search, for example by maximizing thread use for each server fanning out requests.

In accordance with an embodiment, a client invokes an existing public REST domain runtime resource on the admin server, asking it to return a data indicative of at least a portion of an MBean tree from all the running servers. The REST webapp on the admin server maintains a list of all the running servers that must be searched and divides that list into a tree of nested batches of servers to search, deciding which managed servers should assist in fanning out the requests. The list is passed, along with the query from the client, to the admin server.

In accordance with an embodiment, the REST webapp on each server supports an internal search resource that takes the query from the client, which indicates which per-server MBeans should be returned, along with a tree of batches of servers that should be searched. The internal search resource on the admin server processes the specified batch of servers, using its work manager to process in parallel. Each server in the batch is either a leaf node (i.e., a server to be searched directly), or a branch comprising MBean data along with a sub-batch of servers to be searched by another server(s). The internal search resource directly searches leaf nodes, and forwards the sub-batches to the internal search resource of each non-leaf node. The process repeats until the search is propagated to all of the servers.

In accordance with an embodiment, the internal search resource of the REST webapp on each server (admin and managed) can be configured to fan-out a search to other servers. The URL of the internal search resource, can be given as, for example, management/weblogic/<version>/fan-outSearchServerRuntimes and the internal search resource can support the POST method. The internal search resource is configured to receive a JSON request body. The request body specifies the search criteria (i.e. which MBeans and properties to return from each server), and the fan-out criteria (i.e. the tree of nested batches of servers to search, including each server name and URL). The response body includes the search results from each of those servers plus some timing data.

In accordance with an embodiment, the internal search resource fan-out search can resemble, for example, the following syntax:

```
{
requestBody: {
// lists the fields and sub mbeans that should be returned for each server
// (uses the same syntax that is used by REST today for searching the
server runtime tree)
},
// the tree of batches of servers it should search:
fanout: {
// maximum number of milliseconds to wait for the servers to respond.
// zero means wait indefinitely:
maxWait: 10000,
// the batch of servers to be searched in parallel
servers: [
// a server that should be searched by this server (a 'leaf' node)
{ server: 'server1', url: 'http://127.0.0.1:7001' },
// a server that should search a nested batch of servers (an 'intermediate'
node)
{
// the server that this server should forward a nested search request to
server: 'server2', url: 'http://127.0.0.1:7002',
// which servers that server should search
fanout: {
maxWait: ...,
servers: [
{ server: 'server2', url: 'http://127.0.0.1:7003' },
{ server: 'server3', url: 'http://127.0.0.1:7003' },
{ server: 'server4', url: 'http://127.0.0.1:7004' },
]
}
}
]
}
}
```

A JSON response body is returned that contains the results of the search, as well as timing data. The timing data may be used to optimize subsequent searches. An example of the syntax for response is as follows:

```
{
response: {
items: [
{ server: "myserver1", response: { mbeans from server1 ... } },
{ server: "myserver2", response: { ... } },
{ server: "myserver3", response: { ... } },
{ server: "myserver4", response: { ... } },
]
},
statistics: {
startTime: ..., duration: ...,
servers: [
{ server: "server1", startTime: ..., duration: ... },
{
server: "server2", startTime: ..., duration: ...,
servers: [
{ server: "server3", startTime: ..., duration: ... },
{ server: "server3", startTime: ..., duration: ... },
]
}
]
}
}
```

In accordance with an embodiment, each internal search resource waits for its requests to complete, and then aggregates the responses into a single response, and returns the single response. The aggregation repeats until the final response is sent back to the public REST resource on the admin server, which repackages the per-server data to match the specified format. The client gets the response from the admin server. The results can be formatted and appear substantially the same as results displayed via the REST resource returned via processing in serial batches.

The use of REST search requests that fan-out to all the running servers by having additional managed servers participate in the fan out process, where appropriate, can result in significant performance improvement. For example, for an application server environment having 8,000 servers and 20 threads available for each server, the admin server can be instructed to fan-out REST search requests to 20 managed servers, each of which is instructed to fan-out to another 20 managed servers, each of which is instructed to fan-out to a final 20 managed servers. The result is 20 nested batches each comprising 3 tiers of servers.

While the response time for results for a REST search request to a nested batch can be constrained by the slowest responding server (up to time-out) in that nested batch, processing of the servers in each of the 3 tiers is performed in parallel so that, effectively, total response time is reduced to total maximum response time for the slowest (or non-responding) server in each of the 3 tiers across the nested batches, rather than the response time of 400 serially processed sets of 20 threads. If a maximum response time for searching a managed server is 50 milliseconds, an overall response time would be about 0.15 seconds (3 tiers×50 milliseconds), compared with an overall response time for REST search requests sent directly from the admin server which would require about 20 seconds (400 sets×50 milliseconds).

In accordance with an embodiment, a customer can set a parameter to limit how much time a search is permitted to take. For example, a user (or administrator) can use the 'requestMaxWaitMills' query parameter to limit search time. The REST webapp on an admin server uses this value to set the work manager timeout. The REST webapp returns data for the servers that responded in time, and skips the servers that did not, returning a warning indicating that some of the server did not complete in time. The query parameter can also be used to instruct the REST webapp to wait indefinitely.

In accordance with an embodiment, when the REST webapp delegates some of the fan-out work to managed servers, the REST webapp passes along the timeout so that the managed servers fanning out the REST requests honor the timeout. The timeout given to each managed server can be reduced, based on the depth of the fan-out, so that the managed servers have sufficient time to return the values obtained via the REST request to the admin server before the admin server times out.

In accordance with an embodiment, a REST application programming interface (API) is enabled automatically for the application server environment, and does not affect the requests that clients make or the responses they receive. The only difference a client experiences is a faster search.

Figure 5:
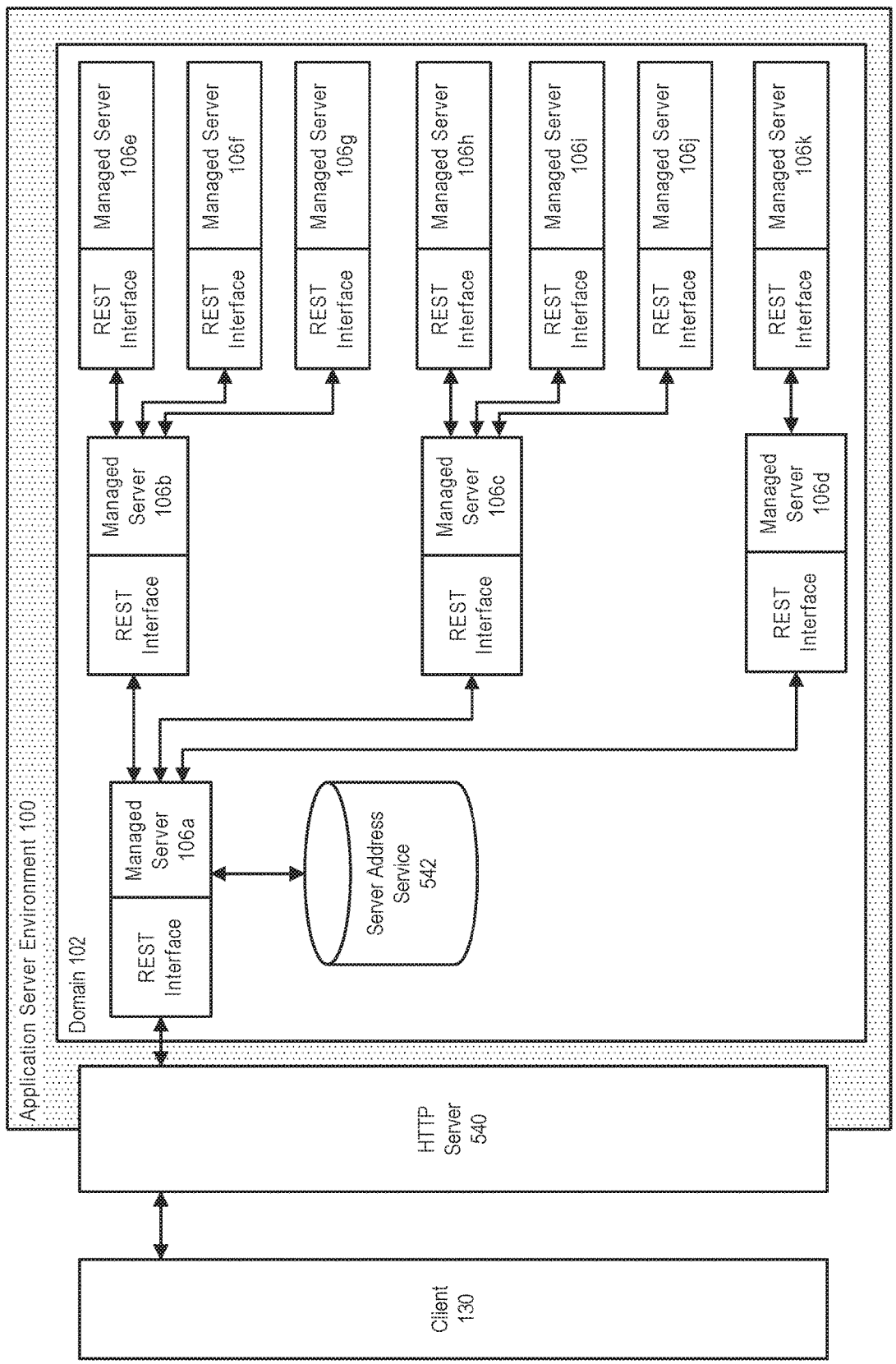
FIG. 5 further illustrates a client requesting metrics from servers in an application server environment, in accordance with an embodiment.

Referring to FIG. 5, in accordance with an embodiment, an application server environment need not necessarily rely on or include an admin server (e.g., a high-availability (HA) administration service model), and can apply REST searches with fan-out via a managed server within the environment acting as a contact for the client. The managed server can receive requests from a client via an HTTP server 540 (e.g., Oracle HTTP Server (OHS)). However, without an admin server, the managed servers may not have knowledge about all of the other servers in the application server environment, such as which other servers are running and what their addresses are on the network. A server address service 542 accessible to the managed servers can store information about the network including machine names, machine addresses, ports, and any other information necessary to allow any server in the application server environment to find and establish communication with every other server in the application server environment.

As shown, a managed server is selected to conduct the REST search with fan-out, and after accessing server information from the server address service creates nested batches to which REST searches are applied. As above, the nested batches are organized to request and receive data from each of the servers in the application server environment.

In accordance with an embodiment, unlike general purpose networking strategies for discovering local endpoints, such as learning bridges, a server address service in an application server environment such as WLS environment is not constrained by network neighborhoods and network locality. Servers can be distributed such that some may be remote while some may be colocated on the same machine. Application server environment could have multiple domains running that are managed separately. The general purpose networking strategies for discovering local endpoints may not work in this environment. A server address service may have to have knowledge of exactly what servers are in this domain and where the servers are located, even as the servers dynamically assigned to different hardware.

Deciding how Requests to Servers should be Batched

In accordance with an embodiment, the admin server (or the designated managed server) creates a tree of batches of servers to be searched. As described above the server can consider using any (or all) of the following three criteria: the number of available threads; where servers are running; and the depth of the search. In accordance with other embodiments other criteria can be used.

In accordance with an embodiment, the REST webapp has a separate work manager dedicated to fanning out searches. This work manager has a configurable minimum number of threads. For example, RestfulManagementServicesM Bean DelegatedRequestMinThreads defaults to 25 threads and has a minimum value of 5 threads. When batching the servers, the REST webapp ensures that no batch is bigger than the configured minimum number of threads. The REST webapp assumes that RPCs between servers running on the same machine are faster than servers running on different machines. As it constructs batches, the REST webapp can prioritize grouping servers running on the same machine into the same batch.

Grouping can take into account that when a sub-batch is created, the parent batch cannot complete until after its sub-batch completes. For example, if a request takes 50 milliseconds, and there are three nested batches, the overall response will take at least 150 milliseconds. Creating sub-batches affects the overall performance, therefore when grouping the servers the REST webapp can also prioritize minimizing the depth of the search (i.e. the number of nestings).

In accordance with an embodiment, heuristics can also be applied by the admin server (or the designated managed server) to define nested groupings. For example, if a server that sends out REST requests has a relatively slow response time, that server can be regrouped so as to be a leaf rather than a branch of a grouping. A leaf is a terminus of a branching group that does not fan out with additional REST requests for data from other servers. In accordance with an embodiment, response information is gathered from each request to a server to determine future groupings and branching schemes. Heuristics can be used to determine groupings based on different specifications. For example, groupings can be defined so that results for each of the groupings are most likely to arrive at the admin server (or the designated managed server) at approximately the same time as results for the other of the groupings.

In accordance with an embodiment, how the servers in an application server environment are grouped into nested batches can be dynamically adjusted based on current network conditions. For example, an internal REST search resource on every server can send back timing data. This information could be used to optimize subsequent searches. If Server 1 and Server 2 are on different machines, but requests between them are fast, servers from these machines can be grouped into the same batch. If Server 3 tends to be slow, it should not be used to fan out requests to other servers.

Client Requests

In accordance with an embodiment, the client can invoke one of two REST resources that fan out a search across all the running servers. First, the client can ask for all of the server runtime MBeans by invoking GET on management/weblogic/<version>/domainRuntime/serverRuntimes. Second, the client can ask for a slice of the runtime bean tree on all the running servers by invoking POST on management/weblogic/<version>/domainRuntime/search, passing in a JSON request body that resembles syntax as follows:

```
{
  children: {
    serverRuntimes: {
    ... list of per server properties and sub mbeans
    that should be returned
    }
  }
}
```

Internal Search Resource Fan-Out Requests

In accordance with an embodiment, the internal search resource first extracts search criteria and the fan-out rules from the request body. For each of the top level servers, the internal search resource extracts the server name and URL from the request body. Then internal search resource determines if that server is an intermediate node (i.e. has its own nested fan-out definition) or is a leaf node (i.e. does not have its own nested fan-out definition).

If the server is a leaf node, then the internal search resource invokes that server's existing management/weblogic/<version>/serverRuntimes/search resource to search the runtime MBeans on that server, passing in the search criteria so that the leaf server knows which MBeans and properties to return.

If the server is an intermediate node, then the internal search resource invokes that server's internal management/weblogic/<version>/fan-outSearchServerRuntimes resource to tell it to do its part of the fan-out. It passes in that server's fan-out criteria as well as the search criteria.

In accordance with an embodiment, the internal search resource uses its work manager to search the top level servers in parallel. The request body also includes a value for the maximum amount of time that the client is willing to wait for a response. The work manager timeout is set to this value. Some of the searches may not have completed before this resource needs to return a response.

In accordance with an embodiment, the internal search resource aggregates the response from each server (succeed, failed, or didn't complete in time) into an overall response, adding in timing data about how long it took to do the overall fan-out, and how long the request to each server took.

Resiliency

REST has built in resiliency support when it uses the JAX-RS client API to send an idempotent REST request from one server to another. The REST resource gets this support when it fans-out requests.

The RestfulManagementServicesMBean has the following configuration settings that control the resiliency behavior:

DelegatedRequestConnectTimeoutMillis—controls how long the JAX-RS client API will wait when trying to connect to a server to make a request.

DelegatedRequestReadTimeoutMillis—controls how long the JAX-RS client API will wait for the server to respond to a request.

DelegatedRequestMaxWaitMillis—if an individual request times out, the request will be retried until this overall timeout has been reached.

It is possible that one of the intermediate nodes in the fan-out is down, which blocks searching a portion of the tree. The resiliency support could switch the fan-out to one of those children instead. However, this may not be necessary for the following reasons:

First, the admin server (or managed server), which defines the fan-out rules, only fans out to servers that it knows are running, reducing the likelihood of such a scenario.

Second, a resilient request to that server has already been made, so if there is a transient issue, the system will likely successfully complete the search anyway. If the issue is not a transient issue, an error message will be returned to the client, who will probably repeat the search. By this time, the admin server should know that the server is not running, and omit it from the fan-out.

Metric Requesting Process

Figure 6:
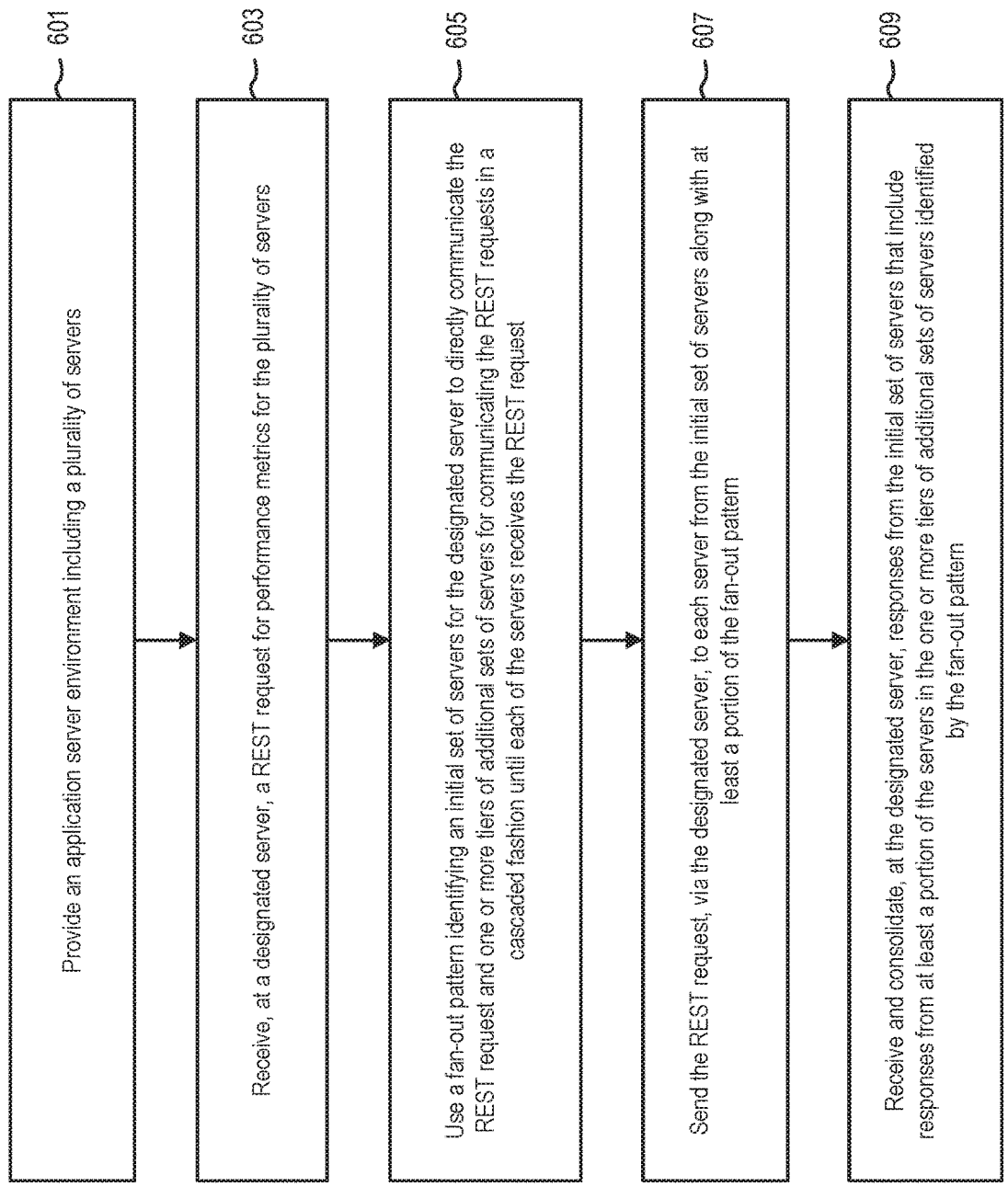
FIG. 6 is a flowchart of a method of requesting metrics from servers in an application server environment, in accordance with an embodiment.

FIG. 6 is a flowchart of a method of requesting metrics from servers in an application server environment, in accordance with an embodiment.

At step 601, an application server executing on one or more computers is provided that includes a plurality of servers. In accordance with an embodiment, the plurality of servers can comprise, for example, an admin server and/or a plurality of managed servers.

At step 603, a REST request for performance metrics for the plurality of servers is received at a designated server. In accordance with an embodiment, the designated server can include, for example, an admin server, or where the application server environment does not includes an admin server, a selected managed server.

At step 605, a fan-out pattern is used that identifies an initial set of servers for the designated server to directly communicate the REST request and one or more tiers of additional sets of servers for communicating the REST requests in a cascaded fashion until each of the plurality of servers receives the REST request. In accordance with an embodiment, a REST request communicated in a cascaded fashion can include, as described above, a REST request sent by the designated server to each server from the initial set of servers requesting performance metrics for that server and further instructing that server to send a REST request to each server from a further set of servers for performance metrics for that server, which REST request may include instructions to each server from a still further set of servers requesting performance metrics for that server, and so on, based on the number of tiers of server sets.

At step 607, the designated server sends the REST request to each server from the initial set of servers along with at least a portion of the fan-out pattern. In accordance with an embodiment, the REST request to each server can include the fan-out pattern. Alternatively, the REST request to each server can include a portion of the fan-out pattern that includes at least the branches for which that server is responsible for communicating REST requests and any additional branches that cascade down to leafs which are servers for which performance metrics are requested, but which are not responsible for sending REST requests.

At step 609, the designated server receives and consolidates responses from the initial set of servers that include responses from at least a portion of the servers in the one or more tiers of additional sets of servers identified by the fan-out pattern. In accordance with an embodiment, if every server identified in the fan-out pattern responds to the REST request sent to it, for example without timing out, then the designated server should receive performance metrics for each of the plurality of servers. However, for example, if a server does not respond within a time-out limit, a server at a higher tier from which it receives a REST request may be instructed to respond to a server at a still higher tier from which that server has received a REST request without performance metrics from the non-responding server.

RESTful Management Search Results Consolidation

In accordance with an embodiment, further described herein is a system and method for providing RESTful management search results consolidation in an application server environment. The system can improve the performance of REST searches that fan-out across multiple servers in a domain by having those servers consolidate the search results based on client-specified criteria.

Many console pages display summarized metrics from runtime MBeans across all running servers. These summarized metrics are intended to provide an overall view into the performance and behavior of an application across a domain, and often provide a navigational entry point allowing an administrator to dive deeply into a particular data set as needed.

FIG. 7 illustrates an example of a WLS admin console page displaying summarized metrics for each servlet in a domain.

Console and FMW Control pages fetch the data from each of the servers, consolidate the data locally (e.g. by calculating min/max/total/average) then display the data. Most implementations make a large number of small grained JMX requests (RPCs) to fetch the data.

As described above, in accordance with embodiments, console and FMW Control pages can achieve significant performance improvements in medium and large domains by making a single REST search request that fetches all of the data in one request.

A response to a search request made, for example, to domainRuntime includes the selected metrics and state for each server in a domain, resulting in a response size that is directly proportional to the number of servers returning information. For example, in a typical environment where 10 applications are deployed, a single server may return 4,000 JSON characters worth of metrics and status to support the monitoring page. Where there are 100 running servers, the response would be 400,000 characters. Where there are 1,000 running servers, then 4,000,000 characters of JSON response would need to be parsed and consolidated to display that single console page. The overhead of transporting and processing these large responses presents a significant constraint on domain size.

In accordance with an embodiment, the system can alleviate the problem of moving and operating on large data sets returned to an admin or managed server by allowing a client to delegate the work of consolidating the data to the REST API. Instead of returning all of the per-server data, a consolidating REST response includes only processed metric and state data that is substantially limited to the summarized or process values requested by the client (e.g., the min/max/total values). Delegated consolidation can effectively eliminate the impact of domain size on the response size for these requests, as response size remains substantially constant as the number of servers increases.

In accordance with an embodiment, search result consolidation, particularly when combined with embodiments as described above that create fan-out patterns and perform fan-out REST searches to gather metrics and status to monitor a domain can significantly improve the responsiveness and user experience of application server (e.g., WLS) management, including in very large domains where performance typically suffers. As a result, the amount of time required to gather metrics and status across a large number of servers is not necessarily the limiting factor in how many servers a domain can practically support.

The management/weblogic/<version>/domainRuntime/search REST API can be used to search for a set of MBeans and properties on all of the running servers. As described above, the client uses the request body to indicate which per-server MBeans and properties should be returned (i.e. the 'search query'). In accordance with a further embodiment, the query syntax of the request can allow the client to indicate that results should be consolidated across the servers and to further indicate how each property should be consolidated (e.g. min, max, total). When this feature is enabled, the response should return one copy of the MBeans instead of one per server with the consolidated values in a response format that is structurally consistent with the unconsolidated search results. If the client does not indicate that the results should be consolidated, then the response returns all of the per-server data.

In accordance with an embodiment, fan-out algorithms used in the REST webapp can be enhanced to distribute data collection to multiple servers. Data can be consolidated at multiple levels and processed and consolidated responses can be returned at each level in the fan-out to reduce and/or minimize the amount of information moved and processed during this aggregation.

In accordance with an embodiment, the client uses the request body to specify a slice of the bean tree to return. The client can specify extra fields in the request body to indicate that the results should be consolidated, and to indicate how they should be consolidated.

In accordance with an embodiment, a REST API provides trees of REST resources corresponding to the various MBean trees, e.g., the edit tree on the admin server, a server runtime tree on each server, and a domain runtime tree on the admin server. The domain runtime resource can also have a 'serverRuntimes' that can be used to access any server runtime tree Each of the REST resources can have an URL, for example as follows:

http://<adminhost>:<adminport>/management/weblogic/latest/edit - the edit tree on the admin server
http://<adminhost>:<adminport>/management/weblogic/latest/serverRuntime - the server runtime tree on the admin server
http://<managedhost>:<managedport>/management/weblogic/latest/serverRuntime - the server runtime tree on a managed server
http://<adminhost>:<adminport>/management/weblogic/latest/domainRuntime - the domain runtime tree on the admin server
http://<adminhost>:<adminport>/management/weblogic/latest/domainRuntime/serverRuntimes/<managedServer> - the server runtime tree on a managed server accessed via the admin server Each of these REST resources can have a 'search' resource that can be used to return a 'slice' of that bean tree, for example:

http://<adminhost>:<adminport>/management/weblogic/domainRuntime/search returns a slice of the domain Runtime tree In accordance with an embodiment, to perform a search, the client POSTs to a "search URL", passing in a request body that contains a template that defines the slice for the tree to return (i.e. which MBeans, properties and links to return from each server). The request body can resemble, for example, the following syntax:

```
curl                ...            -X            POST
http://<adminhost>:<adminport>/management/weblogic/latest/
domainRuntime/search -d "{
links: [ 'self' ], fields: [ 'name' ],
children: {
serverRuntimes: {
links: [ ], fields: [ 'name', 'socketsOpenedTotalCount' ],
children: {
applicationRuntimes: {
links: [ ], fields: [ 'name' ],
children: {
componentRuntimes: {
links: [ ], fields: [ 'name', 'moduleId', 'type', 'deployState',
'openSessionsCurrentCount',
'connectionPoolCount' ]
}
}
},
libraryRuntimes: {
links: [ ], fields: [ 'name' ]
}
}
},
serverLifeCycleRuntimes: { }
}
}"
```

Within the request body, 'fields' indicates which mbean properties will be returned, if not specified, then all fields will be returned, while 'links' indicates which mbean links (i.e. links to related REST resources) will be returned, if not specified, then all links will be returned and 'children' indicates which child mbeans (singletons and collections) will be returned, if not specified, then no children will be returned.

The search given above returns a slice of the domain runtime tree comprising: return the domain runtime mbean's 'self' link and 'name' property; return each nested server runtime mbean's 'name' and 'socketsOpenedTotalCount' properties but do not return any links; return each nested application runtime's 'name' property, but do not return any links; return each nested component runtime's 'name', 'moduleId', 'type' and 'deployState', 'openSessionsCurrentCount', and 'connectionPoolCount' properties but do not return any links; return each nested library runtime's 'name' property but do not return any links; and return each nested serverLifeCycleRuntime's full set of properties and full set of links (since 'links' and 'fields' were not specified). Note that the component runtime's collection is heterogeneous, and that the available properties depend on the type of component. For example, 'openSessionsCurrentCount' is only available for webapp components and will be skipped for other types and 'connectionPoolCount' is only available for connector components and will be skipped for other types.

The unconsolidated search response to this request can resemble, for example, the following:

```
{
name: 'mydomain',
links: [ { rel: 'self', ... } ],
serverRuntimes: { items: [
{
name: 'server1', socketsOpenedTotalCount: 10,
applicationRuntimes: { items: [
{
name: 'app1',
componentRuntimes: { items: [
{
name: 'server1_/module1', moduleId: 'module1', deployState: 2,
type: 'WebAppCompRuntime', openSessCurrentCount: 5
},
{
name: 'server1_/module2', moduleId: 'module2', deployState: 2,
type: 'WebAppCompRuntime', openSessCurrentCount: 6
},
{
name: 'server1_/module3', moduleId: 'module3', deployState: 2,
type: 'ConnectorCompRuntime', connectionPoolCount: 3
}
]}
},
{
name: 'app2',
componentRuntimes: { items: [
{
name: 'server1_/module5', moduleId: 'module5', deployState: 2,
type: 'WebAppCompRuntime', openSessCurrentCount: 7
}
]}
}]},
libraryRuntimes: { ... }
},
{
name: 'server2', socketsOpenedTotalCount: 20,
applicationRuntimes: { items: [
{
name: 'app1',
componentRuntimes: { items: [
```

```
{
name: 'server2_/module1', moduleId: 'module', deployState: 1,
type: 'WebAppCompRuntime', openSessCurrentCount: 2
},
{
name: 'server2_/module3', moduleId: 'module3', deployState: 1,
type: 'ConnectorCompRuntime', connectionPoolCount: 4
},
{
name: 'server2_/module4', moduleId: 'module4', deployState: 1,
type: 'WebAppCompRuntime', openSessCurrentCount: 8
}
]}
},
{
name: 'app3',
componentRuntimes: { items: [
{
name: 'server2_/module6', moduleId: 'module6', deployState: 2,
type: 'WebAppCompRuntime', openSessCurrentCount: 9
}
]}
},
libraryRuntimes: { ... }
}
]},
serverLifeCycleRuntimes: { items: [
{ name: 'server1', state: 'RUNNING', ..., links: [ ... ] },
{ name: 'server2', state: 'RUNNING', ..., links: [ ... ] },
{ name: 'server3', state: 'SHUTDOWN', ..., links: [ ... ] }
]}
}
```

In this example, the results indicate that there are three servers: server1, server2 and server3. Server1 and server2 are running and server3 is shutdown. App1 is running on server1 and server2 and has 4 modules: module1 (webapp, running on both servers), module2 (webapp, only running on server1), module3 (connector, running on both servers) and module4 (webapp, only running on server2). App2 is only running on server1 and has one module, module5 (webapp), and app3 is only running on server3 has one module, module6 (webapp).

An example of statistics gathered at the server level and the component level and returned as unconsolidated results may, as an example, appears as

```
server1: socketsOpenedTotalCount: 10
app1:
module1: type: WebAppCompRuntime, openSessCurrentCount: 5,
deployState: 2
module2: type: WebAppCompRuntime, openSessCurrentCount: 6,
deployState: 2
module3: type: ConnectorCompRuntime, connectionPoolCount: 3,
deployState: 2
app2:
module5: type: WebAppCompRuntime, openSessCurrentCount: 7,
deployState: 2
server2: socketsOpenedTotalCount: 20
app1:
module1: type: WebAppCompRuntime, openSessCurrentCount: 7,
deployState: 1
module3: type: ConnectorCompRuntime, connectionPoolCount: 2,
deployState: 1
module4: type: WebAppCompRuntime, openSessCurrentCount: 8,
deployState: 1
app3:
module6: type: WebAppCompRuntime, openSessCurrentCount: 9,
deployState: 2
```

As can be seen, the result produces data for each application and each module running on that application for each server. However, the client does not need the individual per server values. Rather, the client requests the sum of all the per-server values, that is the client requests values consolidated across server, which values can be returned, for example, as follows:

```
socketsOpenedTotalCount: 10 + 20
app1:
module1: type: WebAppCompRuntime, openSessCurrentCount: 5 + 7,
deployState: [ 2, 1 ]
module2: type: WebAppCompRuntime, openSessCurrentCount: 6,
deployState: [ 2 ]
module3: type: ConnectorCompRuntime, connectionPoolCount: 3 + 2,
deployState: [ 2, 1 ]
module4: type: WebAppCompRuntime, openSessCurrentCount: 8,
deployState: [ 1 ]
app2:
module5: type: WebAppCompRuntime, openSessCurrentCount: 7,
deployState: [ 2 ]
app3:
module6: type: WebAppCompRuntime, openSessCurrentCount: 9,
deployState: [ 2 ]
```

The server runtime trees are merged into one consolidated server runtime tree. For a REST request that includes fan-out to nested branches, data can be consolidated at every nested level, or tier of the search, so that rather than growing exponentially in size, the size of the data will remain relatively at each nested level, or tier.

In accordance with an embodiment, consolidation can be achieved, for example, by receiving from the client a definition, at each level of the server runtime tree search query, of how the merging should be performed.

At the server runtime level, the client can indicate that the server runtime trees should be merged into a single tree and indicate that the socketsOpenedTotalCount property should be totaled and returned.

At the application runtime level, the client can indicate that the application runtimes from each server should be merged together if their 'name' property is the same (i.e. app1 from server1 should be merged with app1 from server2) and indicate that the application name should be returned.

At the component runtime level, the client can indicate that the component runtimes from each server for an application should be merged together if their 'moduleId' property is the same (i.e. module1 of app1 from server1 should be merged with module1 of app1 from server2), indicate that the openSessCurrentCount and connectionPoolCount properties should be totaled and returned, indicate that the type property, which should always be the same for this component, should be returned, indicate that a list of the per-server deployState property values for this component should be returned, and indicate that the moduleId should be returned.

At the server lifecycle runtime level, there is no merging and each server lifecycle runtime mbean is returned.

The syntax for the consolidation search request can resemble as follows:

```
curl                ...                -X                POST
http://<adminhost>:<adminport>/management/weblogic/latest/
domainRuntime/search -d "{
links: [ 'self' ], fields: [ 'name' ],
children: {
serverRuntimes: {
mergeCollection: true,
fields: [ { name: 'socketsOpenedTotalCount', total: true } ],
children: {
applicationRuntimes: {
mergeOn: 'name',
fields: [ { name: 'name', sameValue: true } ],
children: {
componentRuntimes: {
mergeOn: 'moduleId',
fields: [
{ name: 'moduleId', sameValue: true },
{ name: 'type', sameValue: true },
{ name: 'openSessCurrentCount', total: true },
{ name: 'connectionPoolCount', total: true },
{ name: 'deployState', values: true }
]
}
}
}
},
serverLifeCycleRuntimes: {
links: [ ], fields: [ 'name', 'state' ],
}
}
}"
```

Within the request body, 'mergeCollection' is specified at the serverRuntimes level to indicate that the serverRuntime MBean trees should be merged into a single serverRuntime MBean tree and 'mergeOn' is specified at the applicationRuntime level to indicate that the applicationRuntimes from different servers should be merged if they have the same 'name'. It is also specified at the componentRuntime level to indicate that componentRuntimes from the same application but different servers should be merged if their 'moduleId' is the same. If fields including 'mergeCollection' and 'mergeOn' are not specified, then the search results will not be consolidated.

In accordance with an embodiment, a nested 'mergeCollection' is supported so that, for example, the field can be specified at both the serverRuntime and componentRuntime level, indicating that the per-server per-component statistics for each application should be totaled.

Also, within the request body, 'fields' is used to indicate which MBean properties should be returned, 'name' is used to indicate the property name, 'total' is used to indicate that the property values should be totaled, 'sameValue' is used to indicate that the property value should be the same across the merge (e.g. a component's type), and 'values' is used to indicate that a list of property values should be returned.

The search returns a combination of consolidated and non-consolidated MBeans including the merged results of server runtime MBeans and their child application runtime and component runtime MBeans, the unmerged server lifecycle runtime MBeans, and the unmerged top level domain runtime MBean.

The consolidated search response to this request can resemble, for example, the following:

```
{
name: 'mydomain',
links: [ { rel: 'self', ... } ],
serverRuntimes: { items: [ // consolidated
{
socketsOpenedTotalCount: { total: 30, count: 2 }, // 10 + 20, from both servers
applicationRuntimes: { items: [
{
name: 'app1', // on both servers
componentRuntimes: { items: [
{
moduleId: 'module1', type: 'WebAppCompRuntime', // on both servers
deployState: [ 2, 1 ],
```

-continued

```
openSessCurrentCount: { total: 7, count: 2 } // 5 + 2
},
{
moduleId: 'module2', type: 'WebAppCompRuntime', // only on server1
deployState: [ 2 ]
openSessCurrentCount: { total: 6, count: 1 }
},
{
moduleId: 'module3', type: 'ConnectorCompRuntime', // on both servers
deployState: [ 2, 1 ],
connectionPoolCount: { total : 7, count 2 } // 3 + 4
},
{
moduleId: 'module4', type: 'WebAppCompRuntime', // only on server2
deployState: [ 1 ]
openSessCurrentCount: { total: 8, count: 1 }
},
}]
},
{
name: 'app2', // only on server1
componentRuntimes: { items: [
{
moduleId: 'module5', type: 'WebAppCompRuntime',
deployState: [ 2 ],
openSessCurrentCount: { total: 7, count: 1 }
}
}]
},
{
name: 'app3', // only on server2
componentRuntimes: { items: [
{
moduleId: 'module6', type: 'WebAppCompRuntime',
deployState: [ 2 ],
openSessCurrentCount: { total: 9, count: 1 }
}
}]
},
]}
}
]},
serverLifeCycleRuntimes: { items: [ // not consolidated
{ name: 'server1', state: 'RUNNING', ..., links: [ ... ] },
{ name: 'server2', state: 'RUNNING', ..., links: [ ... ] },
{ name: 'server3', state: 'SHUTDOWN', ..., links: [ ... ] }
]}
}
```

In addition to the above described fields, additional search fields can include 'mergeOnPattern', which is similar to 'mergeOn' and contains a property name and a regular expression that is used to extract an 'identity' from a property value. An example might include componentRuntimes: {mergeOnPattern: {name: 'name', pattern: '.*/{id}'}}

The 'mergeOnPattern' field can be used, for example, where naming patterns are used in an application (e.g., HR and Billing), for which aggregated results are desired. A WLS mbean name for the same mbean is different on each server, and the mbean does not have another property that can otherwise be used instead as an identity.

When consolidating search results, 'fields' contains a list of per-property merge rules. If not specified, no properties are returned. Each entry in the list of fields is a JSON object containing the name of the property and its merge rules. The syntax can appears, for example, as follows:

```
fields: [ { name: 'openSessCurrentCount', total: true, min:true,
max:true }, {name: 'type', sameValue: true } ]
```

Multiple merge rules can be specified for the same property (e.g. return the min, max and total). In addition to 'fields', a client can specify in the request an 'exclude-Fields', which is used to specify which properties should not be returned when doing a non-consolidated search (i.e. a list of data not to be returned).

The present invention may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. For example, while several embodiments described above illustrate a multitenant application server environment, embodiments can also be used in other types of application server, cloud, or other computing environments. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for RESTful management distributed collection in an application server environment, comprising:
    one or more computers, including the application server environment executing thereon;
    wherein the application server environment includes a plurality of servers;
    an internal search resource associated with each of the plurality of servers;
    wherein a server from the plurality of servers is designated to receive requests from a client;
    wherein the internal search resource associated with the designated server receives representational state transfer (REST) requests for performance metrics of the plurality of servers from a client, and in response uses a fan-out pattern of requests to the plurality of servers,
        wherein the fan-out pattern identifies
            an initial set of target servers for the designated server to directly communicate the REST request, and
            one or more tiers of additional sets of target servers for communicating the REST requests in a cascaded fashion from the initial set of target servers until each of the plurality of servers receives the REST request;

sends the REST request to the initial set of target servers along with at least a portion of the fan-out pattern;

wherein the designated server receives responses from the initial set of target servers, consolidates the responses and returns the consolidated response to the client; and wherein the designated server receives, in addition to the performance metrics of the plurality of servers, data related to a response time of each of the plurality of servers to the REST request; and determines, for additional REST requests, the fan-out pattern to the plurality of servers based at least in part on the data related to the response time.

2. The system of claim 1, wherein each server from the plurality of servers distributes the REST request to each MBean associated with that server.

3. The system of claim 1, wherein the application server environment is a cloud environment and the designated server is an administration (admin) server.

4. The system of claim 1, wherein the designated server determines the fan-out pattern of requests to the plurality of servers.

5. The system of claim 1, further comprising:

a server address service that includes information for each of the plurality of servers including a machine name, an address and a port identification for each of the plurality of servers; and wherein the designated server is any one of the plurality of servers; and wherein the designated server is configured to request and receive the information for each of the plurality of servers from the server address service; and based on the information received from the server address service determines a fan-out pattern.

6. The system of claim 1, wherein the designated server determines, for each successive additional REST request, the fan-out pattern to the plurality of servers based at least in part applying heuristic techniques to the data related to the response time from one or more previous REST requests.

7. The system of claim 1, wherein each of the plurality of servers consolidates and summarizes data received from every server to which that server fans-out the REST request according to instructions from the client included in the REST request.

8. A method for RESTful management distributed collection in an application server environment, comprising:

using one or more computers, including the application server environment executing thereon;

wherein the application server environment includes a plurality of servers each including an internal search resource;

wherein a server from the plurality of servers is designated to receive requests from a client;

receiving at an internal search resource associated with the designated server a representational state transfer (REST) request for performance metrics of the plurality of servers from a client;

using a fan-out pattern of requests to the plurality of servers, wherein the fan-out pattern identifies an initial set of target servers for the designated server to directly communicate the REST request and one or more tiers of additional sets of target servers for communicating the REST requests in a cascaded fashion from the initial set of target servers until each of the plurality of servers receives the REST request;

sending the REST request to the initial set of target servers along with at least a portion of the fan-out pattern; and receiving responses from the initial set of target servers;

consolidating the received responses;

returning the consolidated response to the client;

receiving, at the designated server, data related to a response time of each of the plurality of servers to the REST request in addition to the performance metrics of the plurality of servers; and determining, via the designated server, the fan-out pattern to the plurality of servers for additional REST requests based at least in part on the data related to the response time.

9. The method of claim 8, wherein each server from the plurality of servers distributes the REST request to each MBean associated with that server.

10. The method of claim 8, wherein the designated server is an administration (admin) server.

11. The method of claim 8, further comprising:

determining, via the designated server, the fan-out pattern of requests to the plurality of servers.

12. The method of claim 8, further comprising:

using a server address service that includes information for each of the plurality of servers including a machine name, an address and a port identification for each of the plurality of servers; and wherein the designated server is any one of the plurality of servers; and wherein the designated server is configured to request and receive the information for each of the plurality of servers from the server address service; and determining, based on the information received from the server address service, a fan-out pattern.

13. The method of claim 8, further comprising:

determining, via the designated server, the fan-out pattern to the plurality of servers for each successive additional REST request based at least in part applying heuristic techniques to the data related to the response time from one or more previous REST requests.

14. The method of claim 8, further comprising:

determining, via the designated server, the fan-out pattern to the plurality of servers for each successive additional REST request based at least in part applying heuristic techniques to the data related to the response time from one or more previous REST requests;

consolidating and summarizing, at each server of the plurality of servers, data received from every server to which that server fans-out the REST request according to instructions from the client included in the REST request.

15. A non-transitory computer readable storage medium, including instructions stored thereon which when read and executed by one or more computers cause the one or more computers to perform the method comprising:

using one or more computers, including the application server environment executing thereon;

wherein the application server environment includes a plurality of servers each including an internal search resource;

wherein a server from the plurality of servers is designated to receive requests from a client;
receiving at an internal search resource associated with the designated server a representational state transfer (REST) request for performance metrics of the plurality of servers from a client;
using a fan-out pattern of requests to the plurality of servers,
wherein the fan-out pattern identifies an initial set of target servers for the designated server to directly communicate the REST request and one or more tiers of additional sets of target servers for communicating the REST requests in a cascaded fashion from the initial set of target servers until each of the plurality of servers receives the REST request;
sending the REST request to the initial set of target servers along with at least a portion of the fan-out pattern; and
receiving responses from the initial set of target servers;
consolidating the received responses;
returning the consolidated response to the client
receiving, at the designated server, data related to a response time of each of the plurality of servers to the REST request in addition to the performance metrics of the plurality of servers; and
determining, via the designated server, the fan-out pattern to the plurality of servers for additional REST requests based at least in part on the data related to the response time.

16. The non-transitory computer readable storage medium of claim 15, including instructions stored thereon which when read and executed by one or more computers cause the one or more computers to perform the method further comprising:
determining, via the designated server, the fan-out pattern of requests to the plurality of servers.

17. The non-transitory computer readable storage medium of claim 15, including instructions stored thereon which when read and executed by one or more computers cause the one or more computers to perform the method further comprising:
using a server address service that includes information for each of the plurality of servers including a machine name, an address and a port identification for each of the plurality of servers; and
wherein the designated server is any one of the plurality of servers; and
wherein the designated server is configured to request and receive the information for each of the plurality of servers from the server address service; and
determining, based on the information received from the server address service, a fan-out pattern.

18. The non-transitory computer readable storage medium of claim 15, including instructions stored thereon which when read and executed by one or more computers cause the one or more computers to perform the method further comprising:
determining, via the designated server, the fan-out pattern to the plurality of servers for each successive additional REST request based at least in part applying heuristic techniques to the data related to the response time from one or more previous REST requests.

19. The non-transitory computer readable storage medium of claim 15, including instructions stored thereon which when read and executed by one or more computers cause the one or more computers to perform the method further comprising:
determining, via the designated server, the fan-out pattern to the plurality of servers for each successive additional REST request based at least in part applying heuristic techniques to the data related to the response time from one or more previous REST requests;
consolidating and summarizing, at each server of the plurality of servers, data received from every server to which that server fans-out the REST request according to instructions from the client included in the REST request.

* * * * *